9347X
J. W. Hatcher,
Apple-Parer,
Patented Feb. 3, 1836.
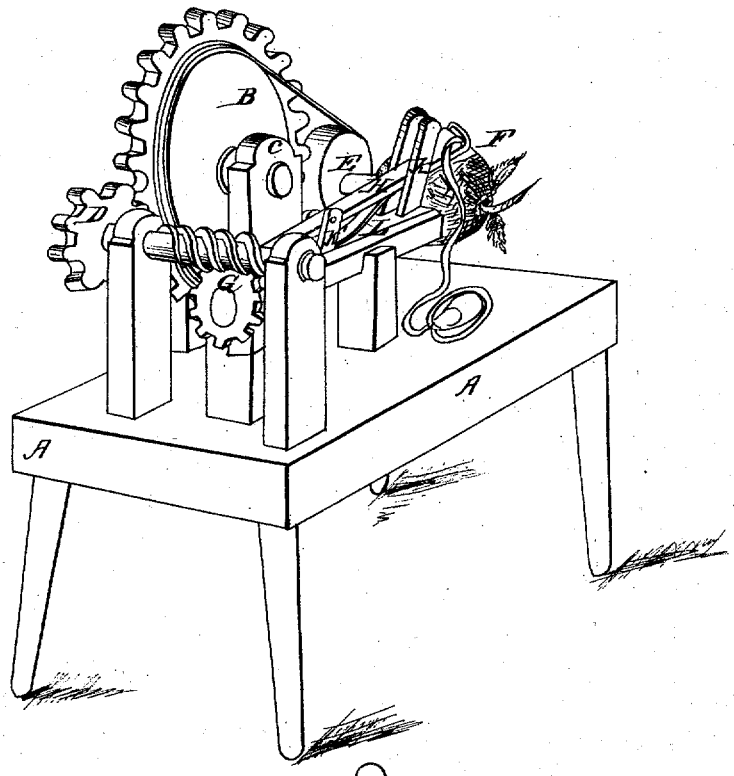
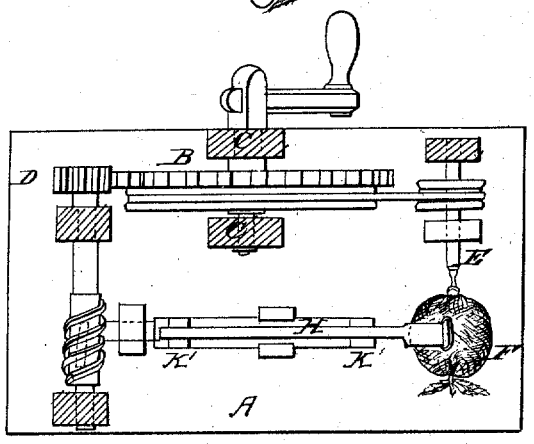
N. PETERS, PHOTO-LITHOGRAPHER, WASHINGTON, D. C.

Feb. 3. 1836 9347X 273

I. W. Hatcher, of Bedford Co. Virginia
Letters Patent.

The schedule referred to in these Letters Patent and making part of the same, containing a description in the words of the said I. W. Hatcher himself of his improvement in the machine for pealing apples and peaches -

---

To all to whom these presents shall come: Be it known that I. I. W. Hatcher of the County of Bedford and State of Virginia have invented a new and useful improvement in a machine for pealing peaches & apples and that the following is a full and exact description thereof -.
1st. A Bench - 2nd a cogwheel & axle or winlas with a handle or crank to turn with the wheel about 11. or 12. inches in diameter with about 30 cogs. set up on 2 upright posts 3d. a small cogwheel say 3 inches diameter with 10 cogs placed to the rear of the large cog wheel - to be turned by it the axle of the small cog wheel in form of a screw 4. a fork or forked spindle with a wheel fixed on two upright posts, a band around the large cog wheew and around the whirl to turn the folk - on which the apple or peach is to be stuck. 5. a small wheel with 10 notches is fixed under and turned by the axle or screw of the small cog wheel the axle of this small wheel extends within about 2½ inches of the end of the folk so as to range with the centre of the peach or apple when stuck on the folk near the wheel is a piece let in to the axle with a mortis to receive end of the piece on which the knife is fixed also near the other end of the axle is another piece let in as before a part taken out so as to form a folk or two uprights or posts in the axle. 6. a piece extending from the post or upright near the small wheel with 10 notches to the folk, tenanted and pined in this post so as to play to and from the axle, and between posts near the other end of the axle which confines is in such manner as to give is a circular motion with the axle also permiting the end over the folk to play to and from the of the apple or peach as it may be large or small, the end of this piece is to be about 1½ inches wide & ½ thick across this end is to be fixed a knife leaving space enough between the knife and piece to permit the pealing to pass between. 7. a spring to be aplied either on top or underneath the piece on which the knife is fixed to bear it from the apple or peach this is done by fastening one end to the axle and the other to the piece on which the knife is fixed, by turning the big cog wheel it gives motion to the whole, as may be seen by the drawing below; That portion or part I claim as my own, is the part giving motion to the knife –

Witnesses
Robert Campbill
Pleasant T. Mallory

I. W. Hatcher

Drawing made

Exd. W.G.C.

[592 words